US010609298B2

(12) United States Patent
Duran et al.

(10) Patent No.: US 10,609,298 B2
(45) Date of Patent: Mar. 31, 2020

(54) ADAPTIVE INFRARED ILLUMINATION FOR EXPOSURE CORRECTION

(71) Applicant: GOOGLE LLC, Mountain View, CA (US)

(72) Inventors: Bill Duran, Santa Cruz, CA (US); Adrian Mircea Proca, Santa Cruz, CA (US); Nikhil Sathe, Monte Sereno, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 15/890,254

(22) Filed: Feb. 6, 2018

(65) Prior Publication Data

US 2019/0246025 A1 Aug. 8, 2019

(51) Int. Cl.
H04N 5/235 (2006.01)
G08B 13/196 (2006.01)
(Continued)

(52) U.S. Cl.
CPC .......... H04N 5/2354 (2013.01); G03B 15/03 (2013.01); G08B 13/19604 (2013.01);
(Continued)

(58) Field of Classification Search
CPC .......... G06K 9/00771; G06K 9/00201; G06K 9/00221; G06K 9/00362; G06K 9/00369;
(Continued)

(56) References Cited

U.S. PATENT DOCUMENTS 8,743,226 B2 * 6/2014 Lee ................. H04N 5/2351
348/143
2012/0320218 A1 * 12/2012 Mori ................ H04N 5/2256
348/164
(Continued)

FOREIGN PATENT DOCUMENTS

EP 3094081 A1 11/2016

OTHER PUBLICATIONS

Google LLC, International Search Report/Written Opinion, PCT/US2019/016703, dated May 21, 2019, 9 pgs.

Primary Examiner — Albert H Cutler
(74) Attorney, Agent, or Firm — Morgan, Lewis & Bockius LLP

(57) ABSTRACT

A system and method that provides adaptive IR illumination for a camera. In some implementations, IR illumination adapts to the objects in a scene being monitored and IR illumination adaptation may be implemented in conjunction with automatic exposure and other exposure adjustment methods. Some implementations include: illuminating a scene using a first IR illumination power; capturing a first image of the scene with a camera; and determining whether a first region of the first image is underexposed or overexposed. When the first region is underexposed, the scene is illuminated at a second power level greater than the first illumination power and a second image is captured. When the first region is overexposed, the scene is illuminated at a third power level that is less than the first illumination power and a third image is captured. The operations are repeated until scene illumination is satisfactory.

23 Claims, 6 Drawing Sheets

(51) Int. Cl.

| | |
|---|---|
| *H04N 5/225* | (2006.01) |
| *H04N 5/243* | (2006.01) |
| *H04N 5/353* | (2011.01) |
| *H04N 5/33* | (2006.01) |
| *G03B 15/03* | (2006.01) |
| *H04N 5/357* | (2011.01) |
| *H04N 9/04* | (2006.01) |

(52) U.S. Cl.
CPC ......... *H04N 5/2256* (2013.01); *H04N 5/2351* (2013.01); *H04N 5/2353* (2013.01); *H04N 5/243* (2013.01); *H04N 5/33* (2013.01); *H04N 5/353* (2013.01); *H04N 5/3572* (2013.01); *H04N 9/045* (2013.01)

(58) Field of Classification Search
CPC .......... G06T 2207/30232; H04N 7/186; H04N 5/23206; H04N 5/23203; H04N 5/235; H04N 5/2352; H04N 5/2354; H04N 5/2256; H04N 5/2353; H04N 5/243; H04N 5/353; H04N 5/33; H04N 5/3572; H04N 9/045; H04N 5/2351; G03B 15/03; G08B 13/19604

USPC ......................................... 348/370, 143–159
See application file for complete search history.

(56) References Cited

U.S. PATENT DOCUMENTS

| | | | |
|---|---|---|---|
| 2013/0251215 A1* | 9/2013 | Coons | H04N 5/33 382/118 |
| 2016/0164261 A1 | 6/2016 | Warren | |
| 2016/0165154 A1* | 6/2016 | Shinomiya | G06F 3/017 348/164 |
| 2016/0277648 A1* | 9/2016 | Yamaguchi | H04N 5/2256 |
| 2017/0118459 A1* | 4/2017 | Kim | H04N 5/33 |
| 2017/0357881 A1* | 12/2017 | Hoshino | G06T 1/00 |
| 2018/0020145 A1 | 1/2018 | Kotfis et al. | |
| 2018/0101723 A1* | 4/2018 | Wakako | G06T 7/70 |
| 2018/0373348 A1* | 12/2018 | Price | G06F 3/0312 |
| 2019/0034723 A1* | 1/2019 | Zhou | G06K 9/0061 |
| 2019/0089889 A1* | 3/2019 | Yamamoto | H04N 5/2354 |

* cited by examiner

ADAPTIVE INFRARED ILLUMINATION FOR EXPOSURE CORRECTION

TECHNICAL FIELD

The disclosed implementations relate generally to controlling a camera in night mode, including, but not limited to, adaptive infrared illumination provided by the camera.

BACKGROUND

Some security cameras operate in one of two modes depending on the ambient lighting conditions. Day mode is used when there is sufficient ambient light to adequately illuminate a scene. Night mode (or IR mode) is used when there is not enough ambient light to adequately illuminate the scene, in which case the camera can provide its own infrared (IR) illumination (e.g., using onboard IR LEDs).

One challenge for such cameras is that when the IR illumination is being provided by the camera during night mode, the IR illumination may result in some areas of the images and video captured by the camera being overexposed and other areas being under-exposed. Various conditions and circumstances may lead to such over or underexposure while IR illumination is active (e.g., the nature of the scene being captured, whether or not external illumination was introduced after the IR illumination became active, etc.). This is a challenge because important details in the images and video captured by the camera may be harder to see due to the over or underexposure.

SUMMARY

Accordingly, there is a need for a security camera that implements more effective methods for exposure correction to improve image quality in night mode.

In accordance with some implementations, systems and methods are described herein that provide more effective IR illumination for a camera. The described systems and methods provide one or more advantages in comparison to prior methods:
  IR illumination that adapts to the scene; and
  IR illumination that may be implemented in conjunction with automatic exposure and other exposure adjustment methods.

In particular, the systems and methods described herein utilize image processing and analysis to determine whether and how much IR illumination modulation, and possibly other exposure adjustment via other methods, is needed to correct an over or underexposure situation in video or images received from a home security camera.

In some implementations, a method for adapting IR illumination in a camera system operating in night mode (i.e., IR mode) includes: illuminating by an IR illuminator a scene using a first IR light at a first illumination power; capturing by the camera's image sensor a first image of the scene within a field of view of the camera, and storing in a memory first image data corresponding to the first image; and determining whether a first region of the first image has an illumination level below a lower illumination threshold, resulting in loss of image detail in the first region due to underexposure, or an illumination level above an upper illumination threshold, resulting in loss of image detail in the first region due to overexposure. When the first region has an illumination level below the lower illumination threshold (i.e., when the first region is underexposed), the method includes: illuminating by the IR illuminator the scene using a second IR light at a second power level that is greater than the first illumination power; capturing by the image sensor a second image of the scene; and storing in the memory second image data corresponding to the second image. When the first region has an illumination level above the upper illumination threshold (i.e., when the first region is overexposed), the method includes: illuminating by the IR illuminator the scene using a third IR light at a third power level that is less than the first illumination power; capturing by the image sensor a third image of the scene; and storing in the memory third image data corresponding to the third image. In some implementations, these operations described above can be performed for one or more regions of the first image that may be over or underexposed. The one or more regions can be contiguous regions of the first image with similar degrees of brightness or darkness (e.g., as identified in the determination operation), or can be predefined tiles of the first image (e.g., a set of tiles of a predefined grid defined with reference to the first image).

In some implementations, when the IR illuminator includes a single IR illuminator element or multiple IR illuminator elements that provide substantially uniform illumination to the scene being monitored and the spatial distribution of the illuminator element(s) cannot be adjusted, overexposure or underexposure of the first region is corrected by decreasing or increasing power and/or the on duty cycle of the IR illuminator element(s).

In some implementations, when the IR illuminator includes multiple IR illuminator elements that provide substantially uniform illumination to the scene being monitored and those elements can be individually turned on or off, overexposure or underexposure of the first region is corrected by individually turning off or on, and/or decreasing or increasing power and/or the on duty cycle of the IR illuminator elements collectively or individually.

In some implementations, when the IR illuminator includes a single IR illuminator element that has an adjustable spatial illumination distribution or directionality with respect to the scene being monitored, overexposure or underexposure of the first region is corrected by adapting the spatial distribution or directionality of the IR illuminator element to decrease IR illumination intensity in the direction of the overexposed region(s) of the first image or to increase IR illumination intensity in the direction of the underexposed regions. In some implementations, spatial or directional adaptions in IR illumination can also be performed in combination with decreasing or increasing power and/or the on duty cycle of the IR illuminator element.

In some implementations, the IR illuminator may include multiple IR illuminator elements that have adjustable or different spatial illumination distributions with respect to the scene being monitored. For example, different illuminator elements may point in different directions or may be configurable to produce light with higher intensity in a selectable direction (e.g., using directional filters or electo-mechanical actuators to select a primary direction of illumination of the illumination element). The illumination elements may also be individually turned on or off. In such implementations, overexposure or underexposure of the first region is corrected by individually turning on or off individual IR elements whose primary illumination direction/spatial distribution is in a direction of the underexposed or overexposed first region and/or the primary illumination direction of individual illumination elements is selected adaptively based on the locations of over or underexposed regions of the first image. In some implementations, such spatial adaptions in IR illumination may be combined with decreasing or increasing power and/or the on duty cycle of the IR illuminator elements, collectively or individually.

In some implementations, independent of, or in combination with adjustment of power or other operational parameters of the IR illuminators to adjust the overall intensity and/or spatial distribution of the IR illumination, over or underexposure conditions may be corrected by adjustment of one or more of the camera's imaging settings, such as frame rate, sensor gain, aperture, and/or exposure time.

In some implementations, an object of interest may be identified in the first image. For example, the object of interest may be an object in a camera's field of view that is in motion, an object identified as likely to be a person who is approaching the front door, or an object identified as an unknown person. Once an object of interest is identified, a first area of the first image corresponding to the object of interest is evaluated as described herein to determine whether the first area is overexposed or underexposed, and the scene illumination is adjusted to correct exposure of the first area if needed. In some implementations, the object of interest is tracked in subsequent video frames and scene illumination provided by the illuminators is adapted as described herein to maintain correct exposure of the object of interest if needed as it moves within the field of view. Thus, for example, if an unknown individual approaches a doorway at night with the result that the individual's face starts to becomes overexposed as it gets closer to the illuminators, with an adaptive illumination method as described herein, illumination is decreased as the individual approaches the doorway and the individual's face stays correctly exposed, which preserves facial features in the resulting camera images/video and prevents underexposure of other portions of the image. Similarly, if an unknown individual is too far away from a surveillance camera to be adequately illuminated, then with an adaptive illumination method as described herein, illumination is increased and the individual or the individual's face stays correctly exposed, which allows detection of the individual's facial features or activities in the resulting camera images/video.

In some implementations, upon determining an extent to which a portion of the image is overexposed (i.e., too bright), the camera may reduce gain of the camera's image sensor or decrease an associated exposure time and/or aperture of the camera to more correctly expose (i.e., darken) an overexposed region in subsequent images. In another example, upon determining an extent to which a portion of the image is underexposed (i.e., too dark), the camera may reduce gain of the image sensor or decrease an associated exposure time and/or aperture of the camera to more correctly expose (i.e., darken) the overexposed region in subsequent images.

In some implementations, determination of the extent of an over or underexposure condition and associated adjustments to camera imaging parameters such as image sensor gain and/or exposure time can be managed by extending capabilities of the camera's automatic exposure (AE) capabilities.

In yet another aspect, some implementations include a system for controlling a camera mode including: a controller, memory storing one or more programs for execution by the controller, a color sensor array comprising a plurality of sensor locations, the sensor locations including first, second and third pixels each having respective peak responses at different respective visible light frequencies, and a lens assembly that is configured to focus light on the sensor array, the one or more programs including instructions for performing any of the methods described above.

In yet another aspect, some implementations include a non-transitory computer-readable storage medium storing one or programs for execution by a camera system that includes a controller, memory storing one or more programs for execution by the controller, a color sensor array comprising a plurality of sensor locations, the sensor locations including first, second and third pixels each having respective peak responses at different respective visible light frequencies, and a lens assembly that is configured to focus light on the sensor array, the one or more programs including instructions for performing any of the methods described above.

Thus, a camera and camera program modules are provided that implement more effective methods for adaptively adjusting IR illumination. Such methods may complement or replace conventional methods for exposure adjustment.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1:
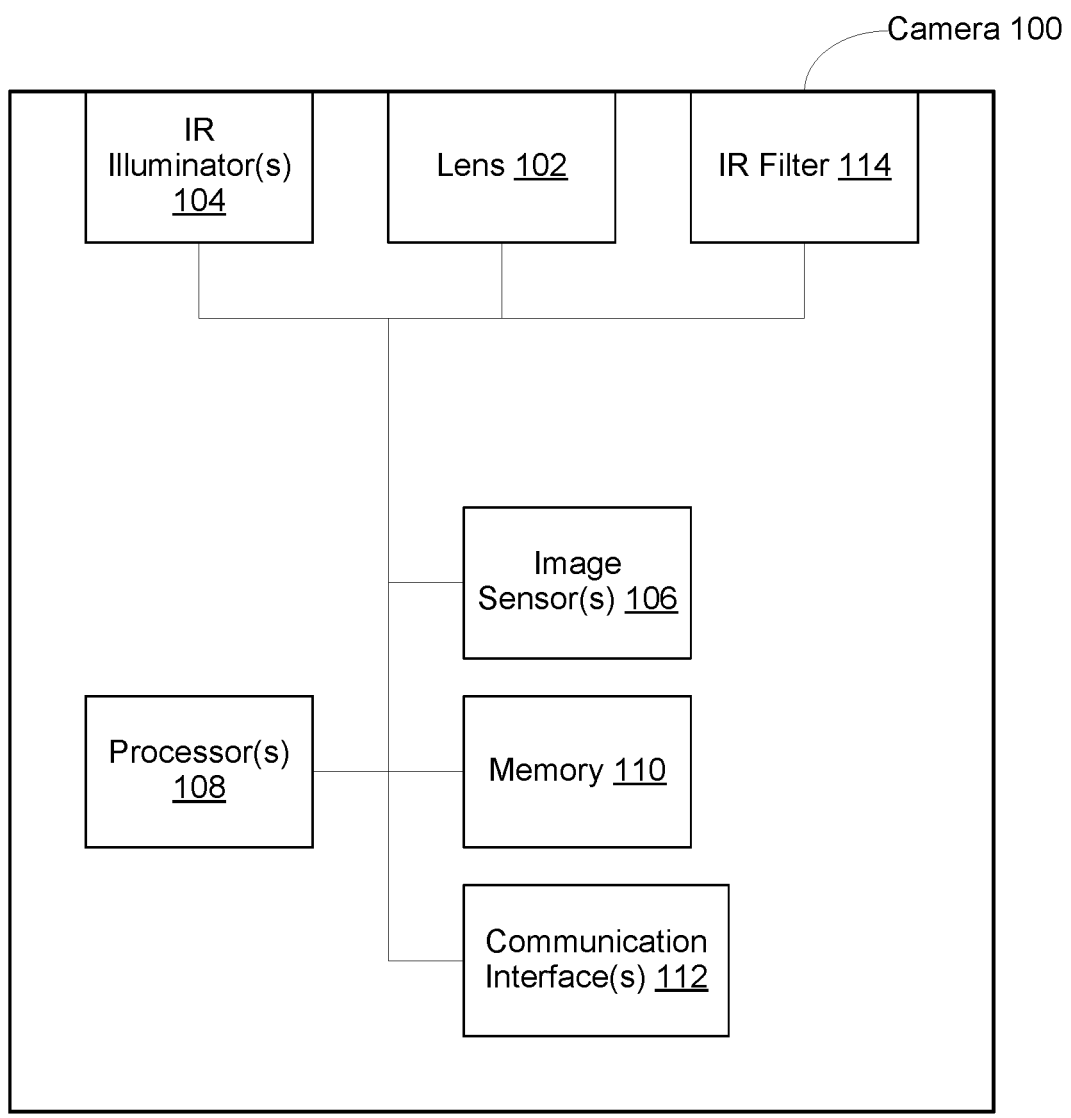
FIG. 1 is an overview block diagram of an image and/or video capturing device (e.g., a camera), in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

When a video monitoring camera is in night mode (also referred to as IR mode), it employs one or more IR illuminators to illuminate a scene in dark or low-light conditions. When a prior camera (e.g., a camera that does not operate in accordance with implementations described herein) illuminates a scene using IR illuminators, it does so indiscriminately—without regard to proximity of surfaces in the scene.

As a result, for a prior video monitoring camera that is mounted in a position where it and its IR illuminators are close to one or more surfaces in a scene (e.g., structural elements of a premise such as walls, corners, eaves, ceilings, built-in cabinets, etc. or one or more objects such as framed photos, furniture, electronic devices, power cords, flower vases, etc.), the problem arises that surfaces of the close elements/objects in the scene in response to illumination produce high levels of reflected IR light when compared to the other surfaces in the scene. This can result in poor image quality of the scene (e.g., in images and/or videos captured by the camera) due to high levels of IR reflection from surfaces that are very close to the camera and within the camera's field of view. The poor images are characterized in that the very close surfaces are super-saturated and overly-bright, while the remainder of the scene (which is likely the part of the scent that includes details of interest) is poorly illuminated/underexposed. In other words, the indiscriminant IR illumination often causes "hiding" of detail in the areas of real interest.

A scenario in which indiscriminant IR illumination can be problematic is where a home security camera with associated IR illuminator(s) is mounted next to a door or integrated into a doorbell (e.g. to monitor activity near a home's entrance). Since exterior doors/home entrances are often inset (e.g., doors are often recessed within an exterior surface of the home within a door frame and surrounding molding and/or are situated in a recessed alcove close to nearby walls and/or positioned under an overhang), this sort of installation results in a camera and associated IR illuminators that are closer to a wall on one side of the installation than the other side, or that are closer to a nearby overhang than other areas of the scene being monitored. In this scenario, in the presence of indiscriminant IR illumination, in video or still images the walls, door frame, molding or overhang that are close to the camera would appear to be overly-bright, while the remainder of the scene, including areas of interest (e.g., the path to the front door, the entrance area, or nearby portions of the front yard) would be poorly illuminated/underexposed, which is contrary to what is desired by a home owner who has installed an exterior home security camera.

Implementations described herein address the problem of overexposure of nearby structures in the presence of IR illumination by adapting the direction (i.e., spatial distribution) and/or intensity of IR illumination produced by IR illuminators associated with a home security camera based on the content of video or still images received from the camera. In particular, the received video images are processed to quickly detect those areas that are saturated/overexposed with IR. This information is then used to adjust the IR emission power of some or all of the IR emitters (e.g., adjust left/right, or top/bottom emitters by turn-off and/or reducing power to particular or all of the IR emitters) until the saturation artifacts of the adjacent reflecting walls are reduced, such that the interesting parts of the image have improved quality.

In some implementations, image processing and analysis are employed to detect overexposed or underexposed regions of an IR-exposed image and, if such a condition exists, to determine how much IR illumination modulation/adaptation, and possibly other exposure adjustment via other methods, is needed to correct the overexposure or underexposure condition. In some implementations, an overexposure detection method includes fast on-off pulsing of the IR emitters to identify hot spots in an image that correspond to overexposed structures in a field of view of the camera (e.g., in some implementations, overexposed structures can be identified as objects in the camera's field of view that visibly "blink" off and on in successive video frames when the IR emitters are pulsed). In some implementations, hot spots are identified by using applying luma thresholds to luma values of individual tiles of the image (e.g., by identifying as hot spots/overexposed areas/tiles with above-threshold luma values). In some implementations, methods for correcting overexposure conditions include selectively turning off the appropriate IR emitters (e.g., when the IR illuminator includes more than one IR emitter) and adjusting IR intensity relative to the "hot spot".

In some implementations, upon detection of motion by the camera (e.g., detection of an object, person or animal moving in the field of view (FOV) of the camera), IR illumination power is increased for a limited amount of time to provide improved signal to noise performance of the camera's image sensor. Increased signal to noise performance improves the likelihood that a person's face is identified by facial detection algorithms that execute in the camera and/or in a server that receives and analyzes video from the camera (e.g., facial detection algorithms implemented in software modules that execute on the camera and/or in the server). Increasing camera signal to noise performance in this way is useful when the methods described herein are implemented in a camera system or smart doorbell whose FOV includes an approach to a monitored building or structure, such as a front walk to a dwelling.

In some implementations, a method for correcting an overexposure or underexposure condition includes modulating IR power to one or more IR illuminators as part of a camera's AE algorithm. The idea is that the AE algorithm is aware of night mode, and the current IR power being used to drive the IR illuminators, and thus can be configured to adjust IR power as part of its adaptation to the scene. In this algorithm, AE also uses tiling to detect situations where the scene is getting overwhelmed by objects close to the camera. In camera designs that employ multiple independently controlled IR LEDs that illuminate various zones within the field of view, over-exposure or under-exposure could be detected within certain tiles to raise or lower power to the LED that covers the zone containing those tiles. The intention of the algorithm is to reduce IR power when possible to make illuminant detection more accurate and to improve overall image quality in night mode.

FIG. 1 is an example device or system 100 for capturing images and video (e.g., a camera or camera system) of a scene, in accordance with some implementations. Camera 100 includes a lens system 102, IR illuminator 104, one or more image sensors 106, one or more processors 108, memory 110, communication interface(s) 112, and an IR filter 114.

The lens system or assembly 102 receives and focuses light onto the image sensors 106. The lens system 102 includes one or more lens. In some implementations, the lens system 102 includes one or more of: a focusing and zooming system or assembly (e.g., for extending the lens toward or away from the scene to adjust focus and/or zoom level), and a shutter system or assembly (e.g., for regulating how much and for how long light is received).

The image sensors 106 capture the light focused by the lens system 102, and convert the captured light into signals that may be recorded as digital data. In some implementations, the image sensors 106 use charge-coupled devices (CCD), complementary metal oxide semiconductors (CMOS), or N-type metal oxide semiconductor (NMOS) technologies.

The IR illuminator 104 emits infrared (IR) light when active. The IR illuminator 104 includes one or more individual IR illumination-emitting units. In some implementations, the IR illuminator 104 includes one or more IR light emitting diodes (LEDs) and each IR LED is an individual IR illumination-emitting unit. In some implementations, the IR illumination-emitting units of the IR illuminator 104 (e.g., a set of multiple IR LEDs) may be powered and controlled individually, in pairs, or in other subsets of the whole set of units. In some implementations, the IR illumination-emitting units of the IR illuminator 104 are powered and controlled in unison (e.g., as a whole set of units).

In some implementations, the IR illumination-emitting units (or "emitters") may have uniform or selectable/controllable illumination directions; and/or each element of an IR illuminator composed of multiple illuminator elements may have one or more different operating characteristics that are independently controllable. For example, different illuminator elements might point in different directions or may be configurable to produce light with higher intensity in a selectable direction (e.g., using directional filters or electomechanical actuators to select a primary direction of illumination of the illumination element). In some implementations, the IR illuminator includes a single IR illuminator element or multiple IR illuminator elements that provide substantially uniform illumination to a scene being monitored and the spatial distribution of the illuminator element(s) cannot be adjusted. In some implementations, the IR illuminator includes a single IR illuminator element that has an adjustable spatial illumination distribution or directionality with respect to the scene being monitored. In some implementations, the IR illuminator 104 can be cycled between on and off states with an adjustable duty cycle (e.g., the duty cycle is the percentage of time the illuminator is on). In different implementations, one or more of these controllable aspects of different illuminator configurations can be adjusted alone or in in combination to correct an overexposure or underexposure condition in images and/or video of a scene within the camera's field of view. The techniques described herein are also applicable to the correction of overexposed or underexposed conditions in images (or portions of images) due to illumination from illuminators active in other than or in addition to IR regions of the electromagnetic spectrum, including but not limited to the visible and ultraviolet regions.

Various implementations described herein refer to adjusting one or more camera parameters (e.g., without limitation: illumination power output, illumination spatial distribution, illumination duty cycle, sensor gain, shutter speed, lens aperture, exposure time, and/or frame rate.) to correct an overexposure or underexposure condition. In some implementations, the amount of such adjustment is a variable amount based on an amount by which the exposure of the overall image or a portion of the image (e.g., a "tile" as described herein) is determined to be above or below an acceptable exposure range. For example, one or more of illumination power, output, gain, shutter speed (or other adjustable camera parameters) can be adjusted by a predetermined percentage of a current value of the respective camera parameter(s) based on an amount (e.g., absolute amount, percentage, or other measure) by which exposure of the overall image or portion of the image is determined to be above or below an acceptable or target exposure range. In some implementations, the amount of such adjustment is a predetermined amount that is stored in memory of the camera, which can be a constant amount for each adjustment step or a predefined pattern of adjustments (such as a pattern of increasing or decreasing constant adjustment amounts for each parameter) that applies to a sequence of adjustment steps. In some implementations, when an overexposure or underexposure condition is being corrected via complimentary/coordinated adjustment of multiple camera parameters, the adjustment of each of the multiple parameters is determined by a pro-rata share (e.g., based on the number of parameters being adjusted) of the adjustment that would made if that parameter were being adjusted individually.

The IR illumination emitted by the IR illuminator 104 may be reflected by the scene (including the elements within) being captured and received by the lens system 102, and focused onto the image sensors 106.

The IR filter 114 filters IR illumination from light being received by the lens system 102, thereby removing the filtered IR illumination from the light. In some implementations, the camera 100 includes a mechanism or other system that is configured to physically manipulate the IR filter 114 (e.g., move the filter, open/close the filter) so that the IR filter 114 may be placed in a position between the lens system 102 and the scene ("in front of" the lens system 102) or in a position between the lens system 102 and the image sensors 106, in order that light being focused onto the image sensors 106 passes through the IR filter 114 first, or removed from that position.

In some implementations, the camera 100 may communicate with one or more other computers, devices, or systems through communication interface(s) 112. For example, the camera 100 may be connected to a network (a local area network, a wide area network, the Internet) through a wired or wireless connection, and communicate with a remote system (e.g., a video or other server system). The communication may include, for example, transmission of images and video to the remote system for processing.

The camera 100 includes one or more processors 108 and memory 110. The processors 108 execute programs and instructions that are stored in memory 110. The memory 110, which may include volatile and non-volatile memory, may store data (e.g., programs, instructions, processed data, data waiting to be processed).

In some implementations, the camera 100 may be operated in day mode or night mode. In day mode, the camera 100 receives ambient light reflected by the scene being captured; ambient light illuminates the scene being captured. During day mode, the IR filter 114 may be positioned in front of the lens system 102 to filter IR illumination in the ambient light. In some implementations, the camera 100 operates in day mode when the ambient light is at least a predefined threshold amount (e.g., 2 lux).

In some implementations, the camera 100 switches to, and operates in, night mode, when the ambient light is less than the predefined threshold amount. In night mode, the IR filter may be removed from its position in front of the lens system 102, and the IR illuminator 104 may be activated. With the IR illuminator 104 activated, the IR illumination emitted by the IR illuminator 104 along with ambient light, illuminates the scene. The camera 100 may switch back to day mode when the amount of ambient light is again above the predefined threshold.

In some implementations, images (e.g., still images, video frames) captured by the camera 100 may be processed and analyzed (e.g., by the camera 100) to determine if there is an underexposure or overexposure condition in the images (e.g., a region or tile of the image that is underexposed or overexposed). Either underexposure or overexposure results in details of the over or underexposed elements being made less clear and less visible to users viewing the images. In some implementations, when the camera 100 determines that there is underexposure or overexposure in an image, the camera 100 may engage in corrective action, such as adjusting power to the IR illuminator 104 and engaging in automatic exposure (AE) adjustments.

Figure 2:
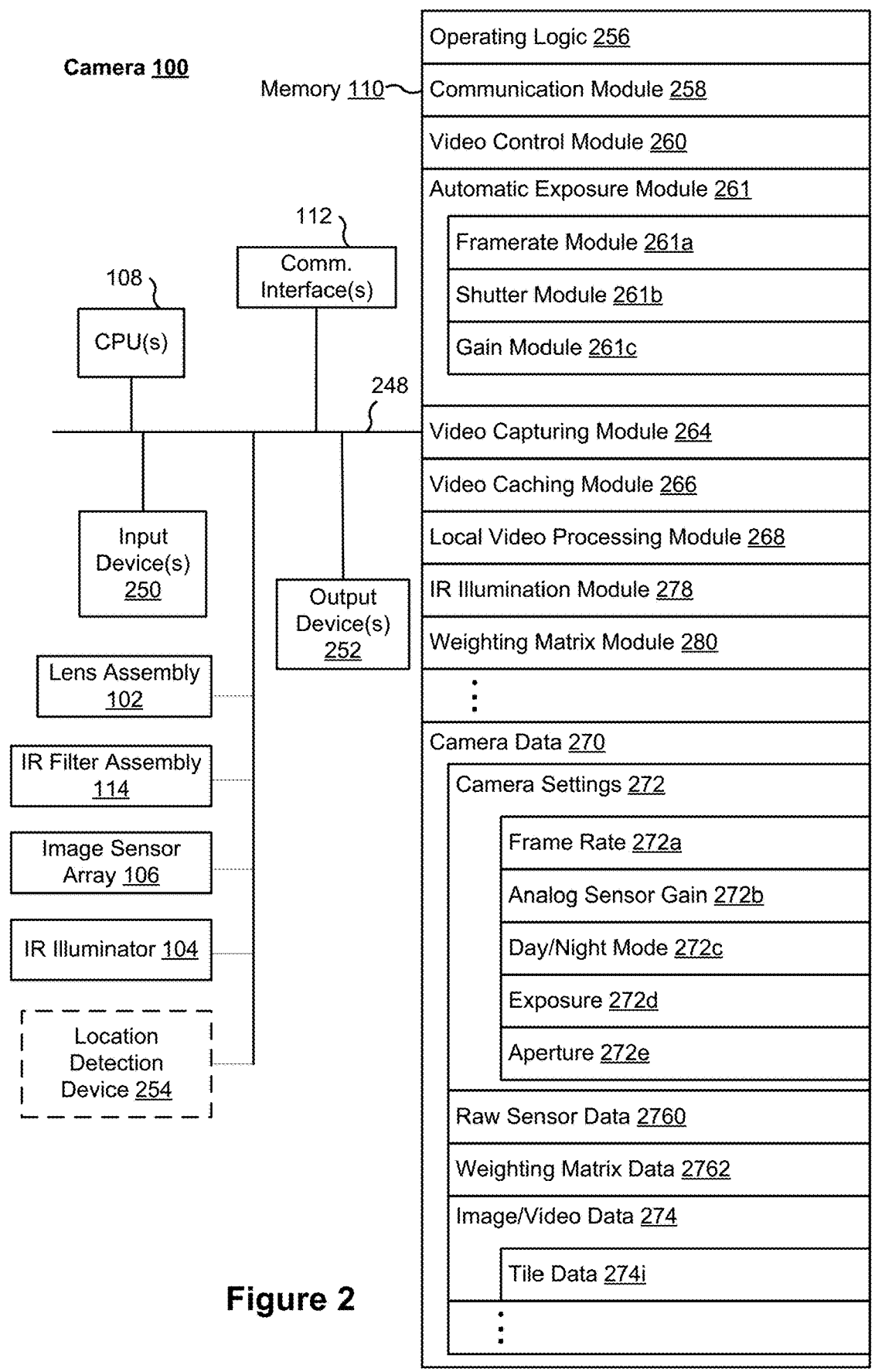
FIG. 2 is a block diagram illustrating a representative image and/or video capturing device (e.g., a camera), in accordance with some implementations.

FIG. 2 is a block diagram illustrating a representative camera 100 in accordance with some implementations. In some implementations, the camera 100 includes one or more processing units or controllers (e.g., CPUs, ASICs, FPGAs, microprocessors, and the like) 108, one or more communication interfaces 112, memory 110, one or more communication buses 248 for interconnecting these components (sometimes called a chipset), a lens assembly 102, an IR filter 114, an image sensor array 106, and IR illuminator 104 (e.g., IR LEDs). In some implementations, the lens system 102 focuses incident light on the image sensor array 106, which captures respective color components (e.g., R, G and B components) of the incident light focused on respective sensor array locations. When the camera is in day mode, the IR filter 114 is enabled/interposed between the lens system 102 and the sensor array 106 to block IR components of the incident light. When the camera is in night mode, the IR filter 114 is disabled so the image sensor array 106 can receive incident IR light from a scene illuminated by the camera's onboard IR illuminators 104 or external IR illuminators. In some implementations, the camera 100 includes one or more input devices 250 such as one or more buttons for receiving input and one or more microphones. In some implementations, the camera 100 includes one or more output devices 252 such as one or more indicator lights, a sound card, a speaker, a small display for displaying textual information and error codes, playing audio, etc. In some implementations, the camera 100 optionally includes a location detection device 254, such as a GPS (global positioning satellite) or other geo-location receiver, for determining the location of the camera 100.

Communication interfaces 112 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 110 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 110, or alternatively the non-volatile memory within memory 110, includes a non-transitory computer readable storage medium. In some implementations, memory 110, or the non-transitory computer readable storage medium of memory 110, stores the following programs, modules, and data structures, or a subset or superset thereof:

Operating system 256 including procedures for handling various basic system services and for performing hardware dependent tasks;
Network communication module 258 for connecting the camera 100 to other computing devices (e.g., a server system, a client device, network routing devices, one or more controller devices, and networked storage devices) connected to the one or more networks via the one or more communication interfaces 112 (wired or wireless);
Video control module 260 for modifying the operation mode (e.g., zoom level, resolution, frame rate, recording and playback volume, lighting adjustment (e.g., auto white balance, automatic exposure and IR modes, etc.) of the camera 100, enabling/disabling the audio and/or video recording functions of the camera 100, changing the pan and tilt angles of the camera 100, resetting the camera 100, enabling/disabling the IR filter 114, and/or the like. The video control module 260 may include a mode control program module (not shown) that determines when to switch from night mode to day mode and vice-versa in accordance with some implementations;
Automatic exposure module 261 (which may be a sub-module of the video control module 260) for performing automatic exposure operations. the automatic exposure module may include a framerate module 261a adjusting framerate, a shutter module 261b for adjusting a shutter speed and/or duration, and a gain module 261c for adjusting gain of the image sensors 106;
Video capturing module 264 for capturing and generating a video stream and sending the video stream to a server system as a continuous feed or in short bursts, and optionally generating a rescaled version of the video stream and sending the video stream at the original captured resolution and the rescaled resolution;
Video caching module 266 for storing some or all captured video data locally at one or more local storage devices (e.g., memory, flash drives, internal hard disks, portable disks, etc.);
Local video processing module 268 for performing preliminary processing of the captured video data locally at the camera 100, including for example, compressing and encrypting the captured video data for network transmission, preliminary motion event detection, preliminary false positive suppression for motion event detection, preliminary motion vector generation, image analysis for detecting over and/or underexposure, etc.;
IR illumination module 278 (which may be a sub-module of the video control module 260) for adjusting power to the IR illuminator 104;
Weighting matrix module 280 (which may be a sub-module of the automatic exposure module 261) for adjusting a weighting matrix used for metering; and
Camera data 270 storing data, including but not limited to:
    Camera settings 272, including network settings, camera operation settings (such as frame rate 272a, analog sensor gain 272b, day/night mode setting 272c, exposure 272d, and aperture 272e), camera storage settings, etc.; and
    Raw sensor data 2760 (e.g., R, G and B components) captured from sensor pixel locations in the sensor array 106 and saved as a raw image frame;
    Weighting matrix data 2762 for metering; and
    Image/Video data 274, including images and video segments with different levels of IR illumination. In some implementations, the image/video data 274 for a particular frame or video segment is indexed and/or stored by tile 274i, each of which represents pixel values of a plurality of individual tiles that collectively make up an image or a video frame.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 110, optionally, stores a subset of the modules and data structures identified above. Furthermore, memory 110, optionally, stores additional modules and data structures not described above.

In some implementations, the camera 100 captures surveillance video using a digital imaging system. Digital images (frames) are captured as a sequence at a particular frame rate 272*a*, compressed, and then sent to the "cloud" (e.g., a server system) for storage and retrieval. In some implementations, each frame (e.g., the raw sensor data 2760) is composed of 1280 by 720 pixels (1280×720) and each pixel location has 3 color components, red, green and blue. The camera 100 operates in one of two modes (e.g., indicated by the day/night mode value 272*c*) depending on the ambient lighting conditions. Day mode is used when there is sufficient ambient light to adequately illuminate the scene. night mode is used when there is not enough light to adequately illuminate the scene.

In some implementations, when operating in day mode, the camera 100 uses the ambient lighting sources to illuminate the scene and capture surveillance video. In some implementations, the minimum lux level at which the camera 100 captures video in day mode is two lux. Once the minimum lux level is reached (i.e., the lux level of the ambient lighting drops below the minimum lux level), the camera automatically switches to night mode. Switching to night mode includes mechanically disabling/removing the IR filter 114 and enabling the IR illuminator 104 to provide illumination for the scene. In some implementations, night mode is maintained until the camera 100 detects an external illuminant or the ambient lighting increases above the minimum lux level (e.g., due to an external illuminant).

Processing of Images to Detect and Correct Over/Underexposure

In some implementations, an image, or a frame of video, captured by the camera 100 while operating in night mode may be processed to determine if there is an over or underexposure condition. If an over or underexposure condition is determined to be present, the camera 100 may take corrective action. For example, in some implementations, the camera 100 may perform operations in accordance with an automatic exposure process (e.g., adjust sensor gain, adjust shutter speed/duration to prevent overexposure in the image as a whole or just in specific overexposed portions of the scene). As another example, the camera 100 may adjust the power to the IR illuminator(s) 104 in order to increase or decrease the IR light emitted by the IR illuminator 104. In such implementations, the overexposed elements of the scene are correctly illuminated, which allows the video monitoring camera to capture subsequent images/videos that reveal details of portions of the scene that were previously hidden due to the overexposure. (As described above, a prior video monitoring camera responds to a high amount of reflected light in a scene it is capturing by adjusting exposure parameters to decrease brightness of the overly bright regions, which results in an image in which portions of the scene likely to be of interest are underexposed/hidden due to the overexposure).

Figure 3A:
FIG. 3A is an image from a camera showing a result of over and/or underexposure during night mode when IR illumination is provided by the camera.

FIG. 3A shows an image from a camera (e.g., camera 100) captured during night mode. In FIG. 3A, the scene is illuminated by the IR light from an IR illuminator (e.g., IR illuminator 104). The IR illuminator emits IR light at a first power level, resulting in the IR light illuminating the scene in FIG. 3A. Note in FIG. 3A that the scene is mostly dark and the details unclear, except for some objects around the bottom and lower right corner of FIG. 3A that appear to be overly bright and thus their details washed out, indicating that there is both underexposure and overexposure in the image.

The image may be processed as a whole to determine whether there is over/underexposure, and how much. This determination may inform the camera 100 on what corrective action to take, and the level of corrective action.

Figure 3B:
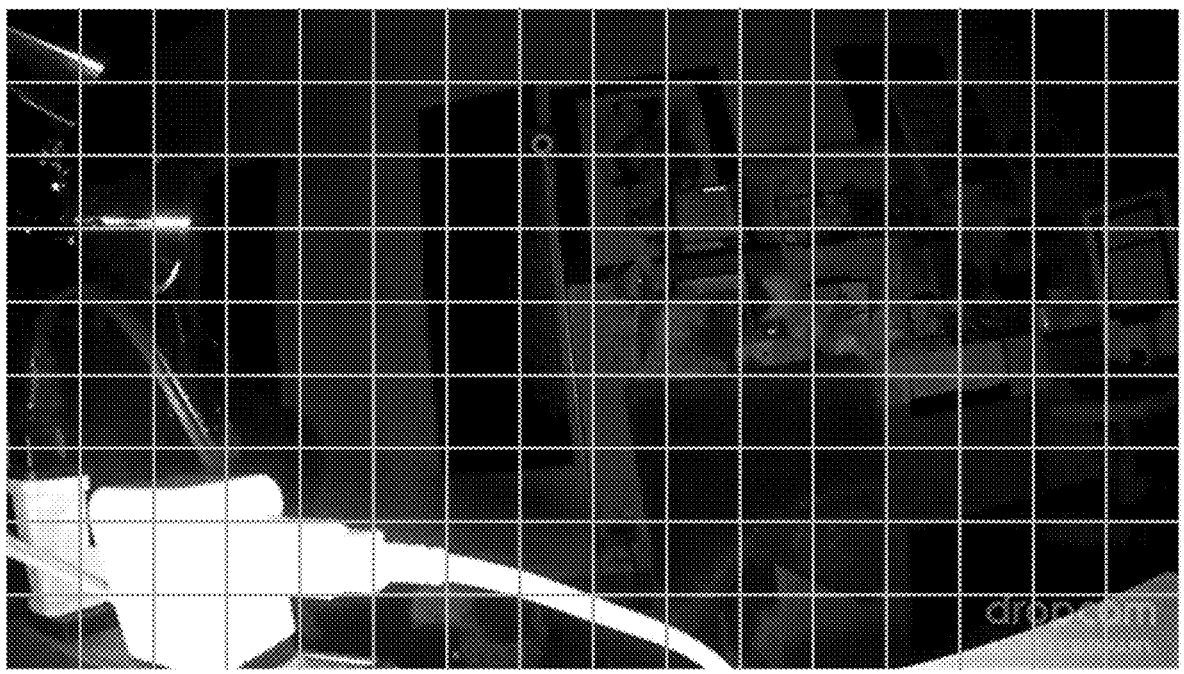
FIG. 3B is an illustration of a tiled arrangement used for processing the image to determine over or underexposure in accordance with some implementations overlaid on the image of FIG. 3A.

In some implementations, the image may be processed based on a tiling approach to determine whether there is over/underexposure, and how much and/or in what particular areas of the image. FIG. 3B shows the image from FIG. 3A with a tiling overlay that a video monitoring camera may apply to the image in some implementations. By using a tiling approach, the camera may determine which parts of the image have an overexposure condition and which parts of the image have an underexposure condition. In some implementations, this determination may inform the camera as to on what corrective action to take, and the level of corrective action. For example, as described herein, in some implementations illumination is adjusted as described with reference to FIGS. 4A and 4B until the overexposed and/or underexposed tiles are correctly exposed.

In some implementations, the camera, based on the determination of overexposed and/or underexposed tiles, performs corrective action that is targeted to specific conditions in specific portions of the image. For example, upon determining an extent to which a portion of the image is overexposed (i.e., too bright), the camera may reduce gain of the image sensor or decrease an associated exposure time and/or aperture of the camera to more correctly expose (i.e., darken) the overexposed region in subsequent images. In another example, upon determining an extent to which a portion of the image is underexposed (i.e., too dark), the camera may increase gain of the image sensor or increase an associated exposure time and/or aperture of the camera to more correctly expose (i.e., brighten) the underexposed region in subsequent images. In some implementations, the determination of the extent of the overexposure and/or underexposure condition and associated adjustments to the camera parameters such as image sensor gain and/or exposure time can be managed by extending capabilities of the cameras automatic exposure (AE) capabilities. In some implementations, illumination is adjusted and overexposed and underexposed tiles are evaluated from a collection of successive images (e.g., images taken of the same field of view of a scene—sometimes closely spaced in time) and tiles from the different successive images selectively combined so a resulting composite image includes correctly exposed regions or tiles from the successive images. Thus, in some implementations, objects of interest can be better illuminated and therefore evaluated in a tiled scene where there are both overexposure and underexposure conditions.

In some implementations, adjustments to one or more camera imaging parameters (e.g., frame rate, sensor gain, aperture, and/or exposure time) are combined with adjustments to illumination power (e.g., of all or a portion of the illuminators) to correct an overexposure or underexposure condition. For example, in some implementations, if an underexposure condition exists, as described above, sensor gain can be increased to attempt to correct the underexposure condition. If at some point in the adjustment operation sensor gain (or other camera parameter) is increased above (or, for the other parameters, decreased below) a predefined operating range and the underexposure condition still exists, IR illumination power (for all or a portion of the IR illuminators) can then be increased until the underexposure condition is corrected (for all or a portion of the image). Similar methods can be implemented based on combined and complimentary adjustment of illumination power and one or more camera parameters. In some implementations, adjustment of multiple parameters is employed where one parameter has a limited range of adjustments or is less effective to correct an underexposure condition as compared to another camera parameter, or simply as an effective strategy to correct an under or overexposure condition while retaining optimum image quality. As noted above, in some implementations, adjustments to illumination power (and/or any other camera imaging parameter that is adjusted in order to correct an overexposure or underexposure condition) can be performed in a predetermined amount (e.g., by a fixed percentage of a current value of the parameter being adjusted or by predefined fixed amount) or in a varying amount (e.g., by a variable percentage based on the amount of overexposure or underexposure to be corrected). The adjustments can also be performed according to a pattern determined to be effective for different respective camera parameters. For example, the pattern can include initial large adjustments followed by small adjustments or vice-versa.

Figure 3C:
FIG. 3C is an image from a camera showing a result of adjustments to IR illumination provided by the camera in the scene and conditions of FIG. 3A, in accordance with some implementations.

FIG. 3C is an image from the camera after corrective action has been taken in accordance with some implementations. For example, based on identifying an ovexposure condition for the bright tiles in the lower left corner of the image shown in FIG. 3B, the camera has adjusted (i.e., reduced) the power to the IR illuminators to correctly expose the overexposed tiles. Note that in in FIG. 3C, as a result of adapting the illumination to prevent this overexposure, the portions/tiles of the image that were previously dark are brighter, and the lower right portion/tiles of the image that were very bright and washed out is less bright, resulting in clearer details throughout the image. This is because correcting the overexposure condition results in other portions of the image being correctly exposed based on application of the camera's AE processing.

Figure 4A:
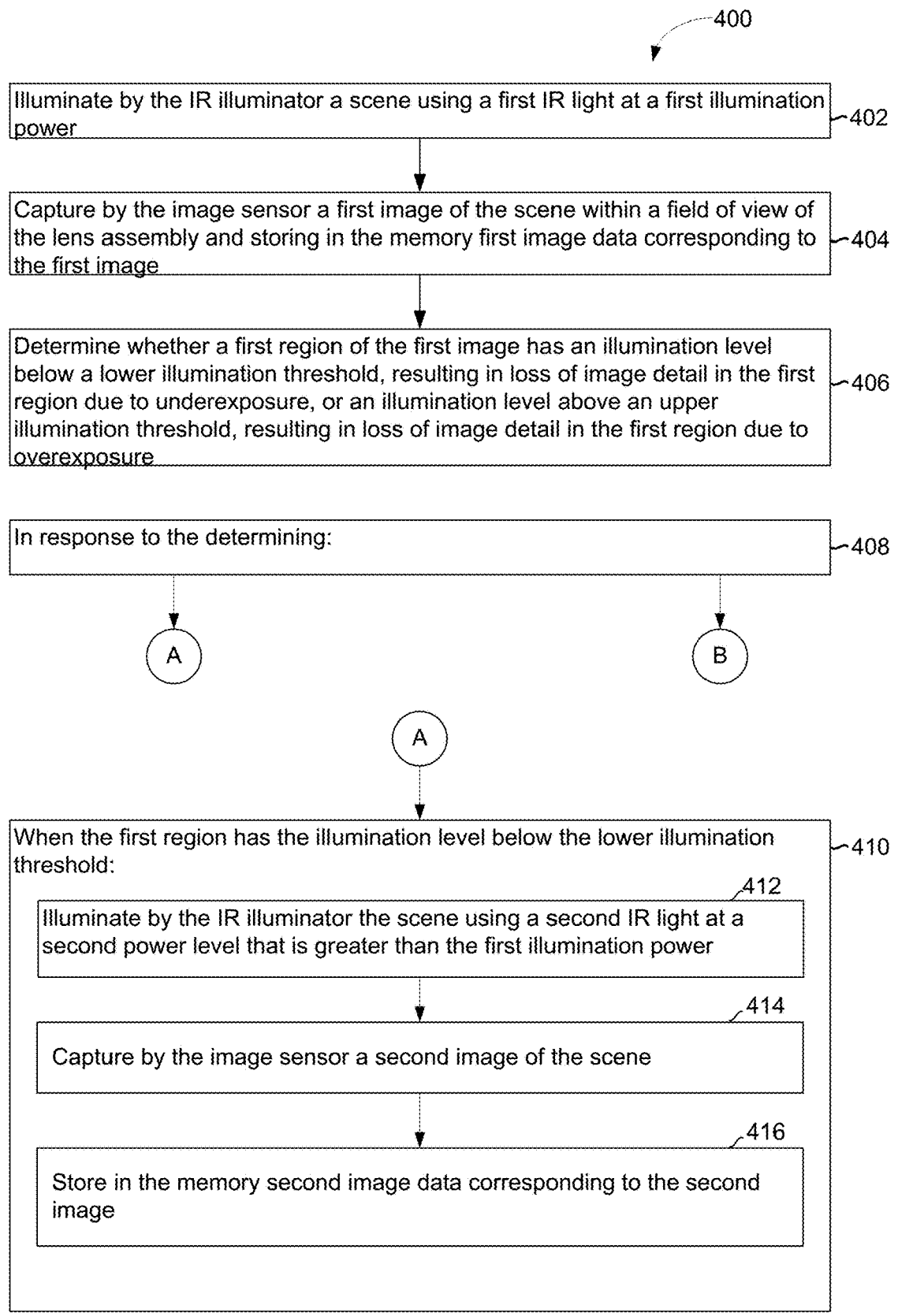
FIGS. 4A-4B illustrate a flowchart diagram of a method for adjusting IR illumination in accordance with some implementations.
Figure 4B:
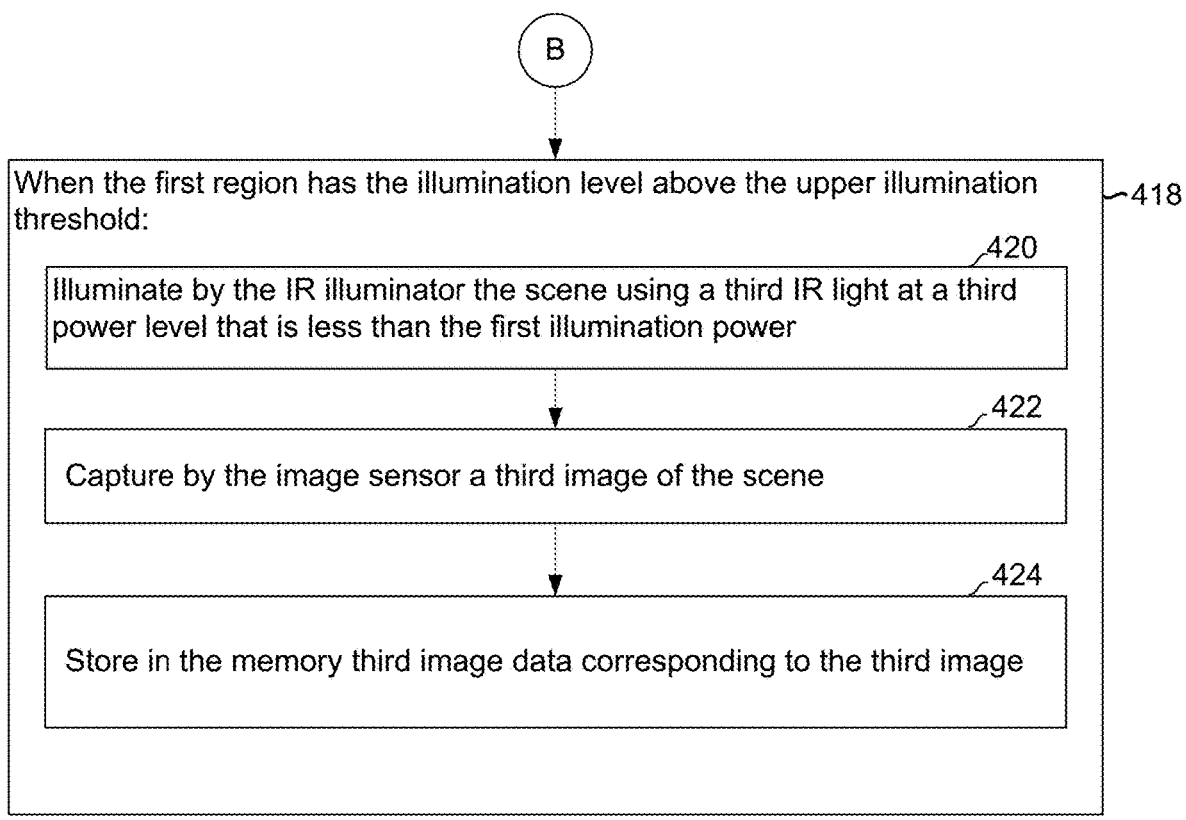

FIGS. 4A-4B illustrate a flowchart diagram of a method 400 for adjusting IR illumination, in accordance with some embodiments. In some implementations, the method 400 is performed by a camera with one or more processors, a lens assembly, an image sensor, a memory for storing programs and image data from the image sensor, and an IR illuminator, and is performed by the camera when the camera is operating in a night mode. For example, in some implementations the method 400 is performed by a camera 100 of FIG. 1, or one or more components thereof, including but not limited to the IR illumination module 278 of FIG. 2. In some implementations, the method 400 is governed by instructions that are stored in a non-transitory computer readable storage medium (e.g., the memory 110) and the instructions are executed by one or more processors of the electronic device (e.g., the CPUs 108).

Referring to FIG. 4A, in some implementations of the method 400 a camera illuminates by an IR illuminator a scene using a first IR light at a first illumination power (402). In some implementations, the first illumination power is a value stored by the IR illumination module 278, which is responsible for controlling output light level of the IR illuminator. The first illumination power can be a predefined or default value or can be determined by the camera 100 based on an overall light level of the scene as detected by the camera (e.g., as detected using an ambient light sensor or ALS provided by the camera). In some implementations, the method 400 includes the camera capturing by the image sensor a first image of the scene within a field of view of the lens assembly and storing in the memory first image data corresponding to the first image (404). It is then determined whether a first region of the first image has an illumination level below a lower illumination threshold, resulting in loss of image detail in the first region due to underexposure, or an illumination level above an upper illumination threshold, resulting in loss of image detail in the first region due to overexposure (406).

Based on results of the determining operation 406, when the first region has an illumination level that is below the lower illumination threshold (i.e., when the first region is underexposed) (410): the camera illuminates by the IR illuminator the scene using a second IR light at a second power level that is greater than the first illumination power (412); capturing by the image sensor a second image of the scene (414); and storing in the memory second image data corresponding to the second image (416).

Based on results of the determining operation 406, when the first region has an illumination level that is above the upper illumination threshold (i.e., when the first region is overexposed) (418): the camera illuminates by the IR illuminator the scene using a third IR light at a third power level that is less than the first illumination power (420); capturing by the image sensor a third image of the scene (422); and storing in the memory third image data corresponding to the third image (424).

Based on results of the operations 410-416 and 418-424, in some implementations, the method further includes: when the first region has an illumination level below the lower illumination threshold (i.e., when the first region is underexposed), increasing a sensitivity of the image sensor. This directly addresses/improves underexposure of the first region by brightening and capturing more detail from the first region in subsequent images. The method also further includes, when the first region has an illumination level above the upper illumination threshold (i.e., when the first region is overexposed), decreasing the sensitivity of the image sensor. This directly addresses/improves overexposure of the first region by darkening (reducing brightness of) the first region in subsequent images.

Based on results of the operations 410-416 and 418-424, in some implementations where the lens assembly includes a shutter system, the method further includes: when the first region has an illumination level below the lower illumination threshold (i.e., when the first region is underexposed), increasing a shutter speed of the shutter system. This indirectly addresses/improves underexposure of the first region as increasing the shutter speed causes the camera to increase the aperture of the camera lens and/or sensitivity of the image sensor and as result brighten and capture more detail from the first region in subsequent images. The method further includes, when the first region has an illumination level above the upper illumination threshold (i.e., when the first region is overexposed), decreasing the shutter speed of the shutter system. This indirectly addresses/improves overexposure of the first region as decreasing the shutter speed causes the camera to decrease the aperture of the camera lens and/or sensitivity of the image sensor and as result darken (reduce brightness of) the first region in subsequent images.

Based on results of the operations 410-416 and 418-424, in some implementations, the method further includes: after storing in the memory the second image data corresponding to the second image: repeating the illuminating, capturing, and determining operations at the second power level; and after storing in the memory the third image data corresponding to the third image: repeating the illuminating, capturing, and determining operations at the third power level. Repetition of these operations can be repeated until the image is correctly exposed.

In some implementations, determining whether the first region of the first image has an illumination level below a lower illumination threshold or an illumination level above an upper illumination threshold includes obtaining a histogram of the first image. In a histogram, each bin (x-axis value) is a value of luma, so the max histogram value is the max luma value. The y-axis of the histogram represents the number of pixels with that particular value of luma. If there are a higher than threshold number of pixels in the upper X % of the bins (where "X" is a variable), then at least a portion of the image is overexposed. In some implementations, histogram analysis is performed on individual tiles within the image to determine if a particular tile is overexposed. Such a per-tile histrogram analysis is a finer grain determination than simply evaluating the luma average of the tile.

In some implementations, determining whether the first region of the first image has an illumination level below a lower illumination threshold or an illumination level above an upper illumination threshold includes dividing the first image into a plurality of regions, or tiles, wherein the first region is one of the plurality of regions.

In some implementations, over or underexposure of the entire image is determined (e.g., by evaluating average luma values over the entire image), sometimes in conjunction with a simple IR modulation scheme where all of the illuminators are modulated with the same illumination levels (i.e., increased to the same level when the overall image is underexposed and decreased to the same level when the overall image is overexposed). In some implementations, sometimes in conjunction with an adaptive illumination scheme in which the illumination levels of specific IR LEDS are individually modulated in order to optimize scene illumination, the image is evaluated as a set of regions (e.g., by evaluating overexposure or underexposure of each region in the set of regions). The regions can be configured in a variety of shapes. For example, in some implementations, for the sake of simplicity, the regions are laid out on a grid over the image, also called "tiles."

In some implementations, determining whether a first region of the first image has an illumination level below a lower illumination threshold or an illumination level above an upper illumination threshold includes obtaining lux level values for the plurality of regions of the first image and based the determination of the overexposure or underexposure condition based on the determined lux level.

Processing of Images to Detect and Correct Over/Underexposure Based on Different Hardware Configurations In some implementations, there are different options for addressing over or underexposure image conditions based on different illuminator and/or camera configurations of the associated imaging and illumination system. For example, in some implementations the IR illuminator may be a single illuminator or be composed of multiple illuminator elements; the one or more IR illuminators may have uniform or selectable/controllable illumination directions; and/or each element of an IR illuminator composed of multiple illuminator elements may have one or more different operating characteristics are independently controllable. Based on combinations of these different illuminator or camera configurations, there are different options that can be implemented in the methods described herein to correct an overexposure or underexposure condition.

For example, in some implementations, when the IR illuminator includes a single IR illuminator element or multiple IR illuminator elements that provide substantially uniform illumination to a scene being monitored and the spatial distribution of the illuminator element(s) cannot be adjusted, overexposure or underexposure of the first region can be corrected by decreasing or increasing power and/or the on duty cycle of the IR illuminator element(s) (i.e., if power to an illuminator is cycled between off and on states, the on duty cycle is the percentage of time the illuminator is on).

In some implementations, when the IR illuminator includes multiple IR illuminator elements that provide substantially uniform illumination to the scene being monitored and those elements can be individually turned on or off, overexposure or underexposure of the first region can be corrected by individually turning off or on, and/or decreasing or increasing power and/or the on duty cycle of the IR illuminator elements collectively or individually.

In some implementations, when the IR illuminator includes a single IR illuminator element that has an adjustable spatial illumination distribution or directionality with respect to the scene being monitored, overexposure or underexposure of the first region may be corrected by adapting the spatial distribution or directionality of the IR illuminator element to decrease IR illumination intensity in the direction of the overexposed region(s) of the first image or to increase IR illumination intensity in the direction of the underexposed regions. In some implementations, spatial or directional adaptions in IR illumination can also be performed in combination with decreasing or increasing power and/or the on duty cycle of the IR illuminator element.

In some implementations, the IR illuminator includes multiple IR illuminator elements that have adjustable or different spatial illumination distributions with respect to the scene being monitored. For example, different illuminator elements might point in different directions or may be configurable to produce light with higher intensity in a selectable direction (e.g., using directional filters or electomechanical actuators to select a primary direction of illumination of the illumination element). The illumination elements may also be individually turned on or off. In such implementations, overexposure or underexposure of the first region is corrected by individually turning on or off individual IR elements whose primary illumination direction/spatial distribution is in direction of the underexposed or overexposed first region and/or the primary illumination direction of individual illumination elements is selected adaptively based on the locations of over or underexposed regions of the first image. In some implementations, such spatial adaptions in IR illumination can combined with decreasing or increasing power and/or the on duty cycle of the IR illuminator elements, collectively or individually.

In some implementations, independent of, or in combination with adjustment of power or other operational parameters of the IR illuminators to adjust the overall intensity and/or spatial distribution of the IR illumination, over or underexposure conditions may be corrected by adjustment of one or more of the camera's imaging settings, such as frame rate, sensor gain, aperture, and/or exposure time.

For example, upon determining an extent to which a portion of the image is overexposed (i.e., too bright), the camera may reduce gain of the camera's image sensor or decrease an associated exposure time and/or aperture of the camera to more correctly expose (i.e., darken) an overexposed region in subsequent images. In another example, upon determining an extent to which a portion of the image is underexposed (i.e., too dark), the camera may reduce gain of the image sensor or decrease an associated exposure time and/or aperture of the camera to more correctly expose (i.e., darken) the overexposed region in subsequent images.

Processing of Images to Detect and Correct Over/Underexposure for an Object of Interest in the Field of View In some implementations, methods described herein for correcting overexposure or underexposure conditions in an image or video are applied to the problem of providing appropriate IR illumination of an object of interest in a camera's field of view. The object of interest can be identified via in-camera image processing (e.g., by identifying a face or large regions of motion in the field of view) or can be identified by a cloud image processing system based on camera images or video received in real-time or in near real-time. For example, the object of interest might be an object in a camera's field of view that is in motion (e.g., a car, bicycle or animal), an object identified as likely to be a person who is approaching the front door, or an object identified as an unknown person. Once an object of interest is identified in an image, a first area of the image corresponding to the object of interest is evaluated as described herein to determine whether that area is overexposed or underexposed, and the scene illumination is adjusted to expose correctly that area corresponding to the object of interest.

In some implementations, the object of interest is tracked in subsequent video frames and scene illumination provided by the illuminators is adapted as described herein to maintain correct exposure of the object of interest as it moves within the field of view. Thus, for example, if an unknown individual approaches a doorway at night with the result that the individual's face starts to becomes overexposed as it gets closer to the illuminators, with an adaptive illumination method as described herein, illumination is decreased as the individual approaches the doorway and the individual's face stays correctly exposed, which preserves facial features in the resulting camera images/video and prevents underexposure of other portions of the image. Similarly, if an unknown individual is too far away from a surveillance camera to be adequately illuminated, then with an adaptive illumination method as described herein, illumination is increased and the individual or the individual's face stays correctly exposed, which allows detection of the individual's facial features or activities in the resulting camera images/video.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both types of user interfaces, but they are not the same user interface.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method implemented in a camera system, comprising:
when the camera system is in a night mode, wherein the camera system includes a lens assembly, an image sensor, a memory for storing image data from the image sensor, and an IR illuminator:
illuminating by the IR illuminator a scene using a first IR light at a first illumination power, wherein the IR illuminator includes a plurality of IR illuminator elements each of which can be individually turned on or off, and the plurality of IR illuminator elements includes the first IR light;
capturing by the image sensor a first image of the scene within a field of view of the lens assembly and storing in the memory first image data corresponding to the first image;

determining whether a first region of the first image has an illumination level below a lower illumination threshold, resulting in loss of image detail in the first region due to underexposure, or an illumination level above an upper illumination threshold, resulting in loss of image detail in the first region due to overexposure;

in response to the determining,
- (A) when the first region has the illumination level below the lower illumination threshold: illuminating by the IR illuminator the scene using a second IR light at a second power level that is greater than the first illumination power by increasing power to a first subset of the illuminator elements of the IR illuminator;
  - capturing by the image sensor a second image of the scene; and
  - storing in the memory second image data corresponding to the second image; and
- (B) when the first region has the illumination level above the upper illumination threshold: illuminating by the IR illuminator the scene using a third IR light at a third power level that is less than the first illumination power by decreasing power to and/or turning off a second subset of the illuminator elements of the IR illuminator;
  - capturing by the image sensor a third image of the scene; and
  - storing in the memory third image data corresponding to the third image.

2. The method of claim 1, further comprising:
when the first region has the illumination level below the lower illumination threshold, increasing a sensitivity of the image sensor; and
when the first region has the illumination level above the upper illumination threshold, decreasing the sensitivity of the image sensor.

3. The method of claim 1, wherein the lens assembly comprises a shutter system, the method further comprising:
when the first region has the illumination level below the lower illumination threshold, increasing a shutter speed of the shutter system; and
when the first region has the illumination level above the upper illumination threshold, decreasing the shutter speed of the shutter system.

4. The method of claim 1, further comprising:
after storing in the memory the second image data corresponding to the second image:
repeating the illuminating, capturing, and determining operations at the second power level; and
after storing in the memory the third image data corresponding to the third image:
repeating the illuminating, capturing, and determining operations at the third power level.

5. The method of claim 1, further comprising:
determining whether the first region of the second image still has the illumination level below the lower illumination threshold;
in accordance with a determination that the first region still has the illumination level below the lower illumination threshold, increasing the second power level, and repeating the illuminating, capturing, and determining operations at the increased second power level.

6. The method of claim 1, further comprising:
determining whether the first region of the third image still has the illumination level above the upper illumination threshold;
in accordance with a determination that the first region still has the illumination level above the upper illumination threshold, decreasing the third power level, and repeating the illuminating, capturing, and determining operations at the decreased third power level.

7. The method of claim 1, wherein determining whether a first region of the first image has an illumination level below a lower illumination threshold or an illumination level above an upper illumination threshold comprises obtaining a histogram of the first image.

8. The method of claim 1, wherein determining whether a first region of the first image has an illumination level below a lower illumination threshold or an illumination level above an upper illumination threshold comprises dividing the first image into a plurality of regions, wherein the first region is one of the plurality of regions.

9. The method of claim 8, wherein determining whether a first region of the first image has an illumination level below a lower illumination threshold or an illumination level above an upper illumination threshold comprises obtaining lux level values for the plurality of regions of the first image.

10. The method of claim 1, wherein each of the plurality of illuminator elements of the IR illuminator provides substantially uniform illumination to the scene.

11. The method of claim 1, wherein the first image data comprises a frame of video data.

12. The method of claim 1, further comprising:
detecting an object of interest in the scene; and
identifying a position of the object of interest in the field of view as the region so as to provide correct exposure of the object of interest.

13. A camera system, comprising:
a lens assembly;
an image sensor;
a memory for storing image data from the image sensor;
an IR illuminator, wherein the IR illuminator includes a plurality of IR illuminator elements each of which can be individually turned on or off, and the plurality of IR illuminator elements includes a first IR light;
one or more processors; and
memory storing one or more programs for execution by the one or more processors, the one or more programs comprising instructions for:
when the camera system is in a night mode:
illuminating by the IR illuminator a scene using the first IR light at a first illumination power;
capturing by the image sensor a first image of the scene within a field of view of the lens assembly and storing in the memory first image data corresponding to the first image;
determining whether a first region of the first image has an illumination level below a lower illumination threshold, resulting in loss of image detail in the first region due to underexposure, or an illumination level above an upper illumination threshold, resulting in loss of image detail in the first region due to overexposure;
in response to the determining,
- (A) when the first region has the illumination level below the lower illumination threshold:
  illuminating by the IR illuminator the scene using a second IR light at a second power level that is greater than the first illumination power by increasing input power to a subset of the illuminator elements of the IR illuminator that produce illumination directed substantially to the first region;

capturing by the image sensor a second image of the scene; and storing in the memory second image data corresponding to the second image; and (B) when the first region has the illumination level above the upper illumination threshold:

illuminating by the IR illuminator the scene using a third IR light at a third power level that is less than the first illumination power by decreasing the input power to and/or turning off at least the subset of the illuminator elements of the IR illuminator;

capturing by the image sensor a third image of the scene; and storing in the memory third image data corresponding to the third image.

14. The camera system of claim 13, wherein the IR illuminator comprises one or more illuminator elements, each of the illuminator elements providing substantially uniform illumination to the scene, wherein the illuminating by the IR illuminator of the scene using a second IR light at a second power level that is greater than the first illumination power comprises uniformly increasing input power to the one or more illuminator elements, and illuminating by the IR illuminator of the scene using a third IR light at a third power level that is less than the first illumination power comprises uniformly decreasing the input power to the one or more illuminator elements.

15. The camera system of claim 13, where each of the plurality of illuminator elements of the IR illuminator has a different spatial illumination direction with respect to the scene being monitored and each of which can be individually turned on or off.

16. The camera system of claim 13, further comprising:

tiling the first image data to produce a plurality of tiles each corresponding to the first image data from a distinct predefined portion of the field of view and determining whether each of the tiles includes an overexposure condition or an underexposure condition; and defining as the first region a contiguous region of the tiles including the overexposure or the underexposure condition.

17. A non-transitory computer readable storage medium storing one or more programs, the one or more programs comprising instructions, which, when executed by a camera system with a lens assembly, an image sensor, a memory for storing image data from the image sensor, an IR illuminator, and one or more processors, cause the camera system to:

when the camera system is in a night mode:

illuminate by the IR illuminator a scene using a first IR light at a first illumination power, wherein the IR illuminator includes a plurality of IR illuminator elements each of which can be individually turned on or off, and the plurality of IR illuminator elements includes the first IR light;

capture by the image sensor a first image of the scene within a field of view of the lens assembly and store in the memory first image data corresponding to the first image;

determine whether a first region of the first image has an illumination level below a lower illumination threshold, resulting in loss of image detail in the first region due to underexposure, or an illumination level above an upper illumination threshold, resulting in loss of image detail in the first region due to overexposure;

in response to the determining, (A) when the first region has the illumination level below the lower illumination threshold:

illuminate by the IR illuminator the scene using a second IR light at a second power level that is greater than the first illumination power by increasing input power to a subset of the illuminator elements of the IR illuminator that produce illumination directed substantially to the first region;

capture by the image sensor a second image of the scene; and store in the memory second image data corresponding to the second image; and (B) when the first region has the illumination level above the upper illumination threshold:

illuminate by the IR illuminator the scene using a third IR light at a third power level that is less than the first illumination power by decreasing the input power to and/or turning off at least the subset of the illuminator elements of the IR illuminator;

capture by the image sensor a third image of the scene; and store in the memory third image data corresponding to the third image.

18. The computer readable storage medium of claim 17, the one or more instructions further comprising instructions for:

tiling the first image data to produce a plurality of tiles each corresponding to the first image data from a distinct predefined portion of the field of view;

determining using an automatic exposure module of the camera system whether each of the tiles includes an overexposure condition or an underexposure condition; and defining as the first region a contiguous region of the tiles including the overexposure or the underexposure condition.

19. The computer readable storage medium of claim 17, the one or more instructions further comprising instructions for:

in combination with adjustment of the power of the IR illuminator, adjusting one or more of the camera's imaging settings, including frame rate, sensor gain, aperture, and exposure time, to compensate for the overexposure or the underexposure.

20. The computer readable storage medium of claim 17, the one or more instructions further comprising instructions for:

detecting an object of interest in the scene; and identifying a position of the object of interest in the field of view as the region so as to provide correct exposure of the object of interest.

21. The computer readable storage medium of claim 20, the one or more instructions further comprising instructions for:

tracking the object of interest as it moves in the scene; and repeating the identifying operation so as to provide correct exposure of the object of interest as it moves in the scene.

22. The computer readable storage medium of claim 20, the one or more instructions further comprising instructions for: transmitting the first image data to a server, wherein the server performs the detecting of the object of interest and the identifying of the position of the object of interest in the field of view.

23. The computer readable storage medium of claim 20, wherein the object of interest is the face of a person in the field of view.

* * * * *